United States Patent [19]
Schmitt

[11] Patent Number: 4,796,731
[45] Date of Patent: * Jan. 10, 1989

[54] COMPRESSION TYPE TRUCK/TRAILER BRAKE SLACK ADJUSTER

[75] Inventor: Eugene W. Schmitt, Lockport, Ill.

[73] Assignee: Sloan Valve Company, Franklin Park, Ill.

[*] Notice: The portion of the term of this patent subsequent to Jun. 10, 2003 has been disclaimed.

[21] Appl. No.: 42,295

[22] Filed: Apr. 24, 1987

[51] Int. Cl.⁴ .................. F16D 65/38; F16D 65/56
[52] U.S. Cl. ......................... 188/196 D; 188/202
[58] Field of Search ............. 188/196 D, 202, 203, 188/79.5 K, 71.9

[56] References Cited

U.S. PATENT DOCUMENTS

| | | | |
|---|---|---|---|
| 3,043,406 | 7/1962 | Larsson | 188/203 S X |
| 3,593,826 | 7/1971 | Sander | 188/202 X |
| 3,744,596 | 7/1973 | Sander | 188/196 D X |
| 3,970,173 | 7/1976 | Sander | 188/203 |
| 4,050,554 | 9/1977 | Scheffel | 188/203 |
| 4,570,763 | 2/1986 | Billeter | 188/196 D |
| 4,593,797 | 6/1986 | Schmitt | 188/202 X |

FOREIGN PATENT DOCUMENTS

| | | | |
|---|---|---|---|
| 3804040 | 8/1985 | Fed. Rep. of Germany | 188/202 |
| 1440966 | 6/1976 | United Kingdom | 188/196 D |

Primary Examiner—Andres Kashnikow
Assistant Examiner—Richard Potosnak
Attorney, Agent, or Firm—Kinzer, Plyer, Dorn, McEachran & Jambor

[57] ABSTRACT

A combination in-line brake slack adjuster and air chamber for connection to a vehicle brake shaft lever arm includes an air chamber and a piston movable in the air chamber. The slack adjuster is of the compression type and is coaxially attached at one end to the piston and at the opposite end is adapted for connection to a vehicle brake shaft lever arm. The slack adjuster reacts to a coaxially applied brake application force by the piston to apply a force to the brake shaft lever arm and automatically takes up and lets out slack as determined by movement to a full brake application position to maintain a generally uniform travel of the piston during brake application.

2 Claims, 2 Drawing Sheets

4,796,731

COMPRESSION TYPE TRUCK/TRAILER BRAKE SLACK ADJUSTER

SUMMARY OF THE INVENTION

The present invention relates to slack adjusters of the type used on vehicles, specifically over-the-road tractor/trailer units, and is particularly concerned with a compression type slack adjuster which automatically takes up and lets out slack during brake application and release movements.

A primary purpose is a slack adjuster of the type described which maintains generally uniform piston travel during brake application.

Another purpose is a slack adjuster of the type described which maintains uniform piston travel during brake application whereby, when applied to a multi-wheeled vehicle, will insure that there is uniform application of brakes to each wheel of the vehicle.

Another purpose is a slack adjuster of the type described which is coaxially aligned with the brake application load, thereby reducing the force required to make slack adjustments having the consequent result of reducing wear on the slack adjuster parts.

Another purpose is a slack adjuster of the type described which is totally sealed, thereby providing protection from grime, salt and debris, customarily found in the environment in which over-the-road vehicles operate.

Another purpose is an in-line brake slack adjuster and air chamber for use in the environment described which is reliable in construction and operation and substantially reduces the forces required to make slack adjustments during operation.

Another purpose is a slack adjuster of the type described which is directly attached to the air chamber diaphragm and piston.

Another purpose is a slack adjuster of the type described which eliminates manual adjustment.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
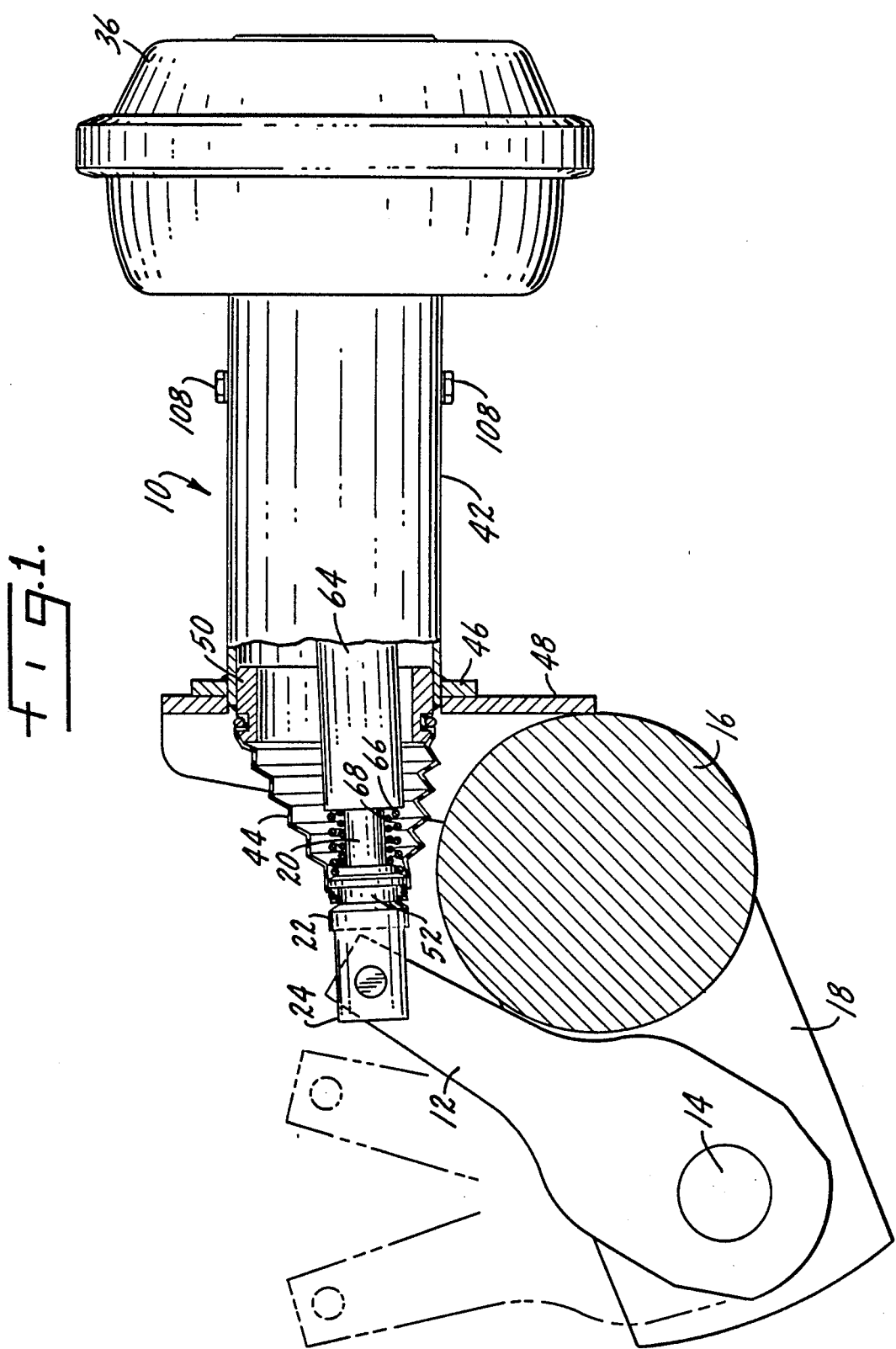
FIG. 1 is a side view, in part section, showing the slack adjuster of the present invention.
Figure 2:
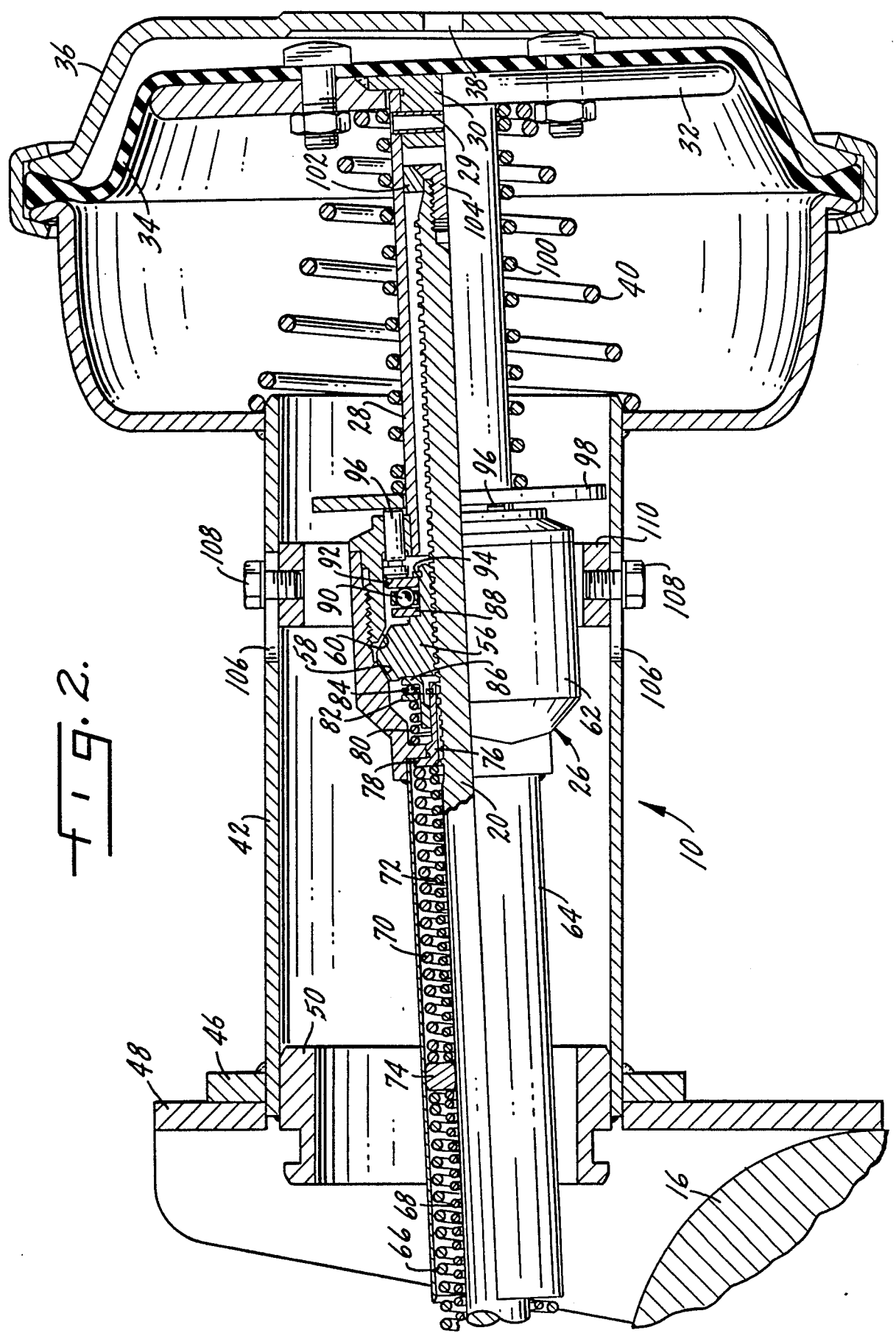
FIG. 2 is an enlarged partial section of the slack adjuster of FIG. 1.

The present invention is concerned with slack adjusters and particularly slack adjusters for use in over-the-road vehicles such as tractor/trailer combinations. The construction of the slack adjuster is substantially similar to that shown in my U.S. Pat. No. 4,593,797, the disclosure of which is incorporated herein by reference, which shows a slack adjuster for use in a railroad environment. The present invention adapts a slack adjuster of that type for use in over-the-road vehicles.

Most slack adjusters of the automatic type which are presently in use on over-the-road vehicles are designed to automatically take up slack, but can only manually let out slack, principally when new brake linings are installed. However, there are circumstances and situations during vehicle operation in which it is desired to automatically introduce slack into the brake system, particularly when the brake drums have become overheated and then cooled. Unless slack is maintained in the system when the drums are overheated and thus expanded, there may be a loss of brake force because of excessive piston travel. When brake drums cool, the clearance between drum and lining is reduced which could inhibit movement of the vehicle. The present invention provides a means whereby the vehicle operator can automatically introduce proper slack into the system, when the brake drums are overheated, for example if a vehicle is going down a long and steep incline, and at such time as the drums subsequently cool down, the slack can be taken up during subsequent brake application. Further, because the present invention both automatically takes up and lets out slack, the need for manual adjustment is eliminated.

Most present day vehicle brake slack adjusters include the adjuster as a part of the lever arm which transfers load from the brake application rod to what is known as the S-cam brake shaft. Since the slack adjuster is a part of the lever arm, the force applied to it, and consequently the forces required to make slack adjustment, are extremely high as the load applied to the lever arm is the brake application force times the length of the lever arm. However, by providing a slack adjuster which is in effect a part of the brake application rod, is coaxial with the rod and in line with the brake application air chamber, the forces applied to the slack adjuster are substantially reduced resulting in a slack adjuster with considerably increased life and one in which the forces required to make adjustment during operation are considerably decreased.

The present slack adjuster is totally sealed in contrast with the lever arm type slack adjusters. As is well known, over-the-road vehicles operate in an environment in which there is dirt, water, salt and the like found on the roadway. With a sealed slack adjuster there is little or no damage from the elements and the slack adjuster will again have increased life.

Since an over-the-road vehicle normally has a slack adjuster as a part of the brake system for each wheel, it is quite necessary that the brake application forces on the wheels be applied simultaneously, rather than at staggered intervals. The present invention is specifically directed to a slack adjuster which insures uniform piston travel, thereby insuring that the brake application to each of the vehicle wheels will be simultaneous. The clearance between the brake lining and the drum which determines piston stroke will be taken up equally as the brakes on the various wheels are applied, thereby insuring simultaneous brake application on all wheels of the vehicle.

In the drawings, the combination brake slack adjuster and air chamber is indicated generally at 10 and has the left end thereof, as illustrated in the drawings, attached to a lever arm 12 which is the typical lever arm used in a vehicle brake system. Lever arm 12 is mounted on the S-cam shaft 14 which is shown as it is conventionally positioned adjacent the axle 16 of the vehicle. The S-cam shaft 14 is held in position by a bracket 18 in a position adjacent the axle of the vehicle.

Looking specifically at the slack adjuster/air chamber combination, the slack adjuster consists of relatively telescoping members, one of which is a threaded rod 20 which has a guide 22 at its left end, which guide carries a clevis 24 pivotally mounted to lever 12. The other telescoping member is in the nature of a clutch housing assembly indicated at 26 which has as a part thereof a compression tube 28. The compression tube, at the right end thereof, is attached by a pin 29 to a piston plug 30 which is welded or otherwise attached to a piston head 32. The piston head 32 is attached to a diaphragm 34 which has its periphery attached to an air chamber housing 36 having an air inlet 38. Thus, opposite ends of the telescoping members of the slack adjuster, the adjusting screw 20 and clutch housing assembly 26 are attached, respectively, to the brake operating lever and to the air chamber which provides the brake operating force.

Air chamber 36, which contains diaphragm 34 and movable piston 32 therein, mounts a piston spring 40 which functions as a return spring to return the piston and the brake operating members to a brake release position when air is vented at 38 from the brake chamber. Brake chamber 36 is welded or otherwise attached to a coaxially arranged outer housing 42 which encloses the principal portions of the slack adjuster and which mounts a rubber boot 44 at one end thereof, with the boot extending outwardly over that end of the slack adjuster which is attached to the brake operating lever 12. The slack adjuster is completely enclosed and sealed by housing 42 and rubber boot 44 and by that portion of the brake chamber 36 which encloses the right-hand end of the slack adjuster.

Rubber boot 44 is attached at one end thereof to an end ring 50 which is welded or otherwise secured to the open end of outer housing 42. The opposite end of rubber boot 44 is positioned within a groove 52 in spring guide 22.

The slack adjuster and in-line brake chamber mount an end plate 46 at the left-hand side of outer housing 42 with the end plate being suitably attached to a mounting bracket 48 which positions the assembly closely adjacent to the vehicle axle.

Threaded rod 20 mounts a clutch element or disc 56 thereon, which clutch element is positioned between opposing clutch faces 58 and 60 formed by the clutch housing assembly. The clutch housing assembly which has compression tube 28 as an integral part thereof includes a clutch housing 62 which is integral with a main spring housing 64. The main spring housing extends telescopically along threaded rod 20 and retains the main spring assembly coaxial with the threaded rod. The main spring assembly includes four coaxially arranged springs consisting of a first outer main spring 66, a first inner main spring 68, a second outer main spring 70 and a second inner main spring 72. One end of main springs 66 and 68 is retained by spring guide 22 with the opposite end of these springs bearing against a floating separator 74. One end of springs 70 and 72 bear against the floating separator with the opposite end of main springs 70 and 72 bearing against a bushing 76 which has an outward extension 78 bearing against a portion of clutch housing 62. Positioned within the clutch housing and mounted about the axial extension of bushing 76 is a lock-up spring 80 which is held at one end by the inward extension of clutch housing 62 which coacts with bushing 76 and at the opposite end bears against a thrust washer 82 adjacent a ball thrust retainer 84 which in turn is in contact with a spring seat 86 which bears against clutch disc 56.

The opposite side of clutch disc 56 has an axial extension which supports a bearing consisting of a thrust washer 88, a ball thrust retainer 90 and a thrust washer 92, all held in place by a retaining ring 94. Thrust washer 92 in turn is in contact with a plurality of clutch pins 96 which extend through openings in clutch housing assembly 26 with the opposite end of each of the pins being contacted by a thrust plate 98.

Thrust plate 98 is coaxial about and movable relative to compression tube 28, bears against the clutch pins 96, as described, and is urged toward the left by a trigger spring 100. Spring 100 is confined by thrust plate 98 at one end and at the other end by piston head 32.

Positioned within compression tube 28 is an adjusting screw stop 102 which is held by a screw 104 to the far right end of adjusting screw 20, with the adjusting screw stop functioning both to limit movement of the adjusting screw and to center the adjusting screw within the compression tube.

Outer housing 42 has a plurality of slots 106, each of which holds an adjusting screw 108 with the adjusting screws together positioning an adjusting ring 110 on the inside of the outer housing and in a position to be contacted by thrust plate 98 during operation of the brakes, as will be described.

When the brakes are to be applied, air will be admitted through opening 38 into the brake chamber which will cause movement of the diaphragm and piston head 32 toward the left. Movement of the piston head will be transferred to compression tube 28 and thus to clutch housing assembly 26 and through bushing 76 to main springs 66, 68, 70 and 72. The main springs in turn will cause movement of adjusting screw 20 and spring guide 22 to the left, which will cause lever arm 12 to rotate the S-cam shaft to apply the brakes. The main springs will urge adjusting screw 20 and the clutch housing in opposite directions, but will transfer brake application movement to the adjusting screw and from the adjusting screw to the brake application lever arm. It is important to note that the brake chamber and brake slack adjuster are in line and in effect form the brake operating rod for applying brake operating force to lever arm 12.

When the brakes have been fully applied and there is no further rotation of lever arm 12 about the S-cam shaft axis, continued movement of piston 32, and the consequent movement of clutch housing 26, will relieve some of the spring force applied by the main spring assembly to clutch disc 56 through the contact between the disc and the clutch housing. There will continue to be force applied to maintain the clutch disc against clutch face 58 from trigger spring 100, as this spring applies force to thrust plate 98 and by the thrust plate through clutch pins 96 to the bearing structure on the right side of the clutch disc.

However, after movement of the piston head and the slack adjuster through a predetermined distance to the left, thrust plate 98 will contact adjusting ring 110 and after such contact the trigger spring no longer will apply a force through the clutch pins to the clutch disc. At this point the clutch disc is free to rotate on the adjusting screw and to move from clutch face 58 to clutch face 60. This movement is brought about by lock-up spring 80 and as the clutch disc so moves, and as it rotates on the adjusting screw, slack is introduced into the system in that the length of the slack adjuster is very slightly decreased by an amount equal to the effective axial movement of the clutch disc in rotating between the two described clutch surfaces. When the clutch disc is in contact with clutch surface 60, the slack adjuster is then fully locked up and rigid as force applied from piston head 32 is applied by the compression tube to the clutch housing assembly, and by the clutch housing assembly directly to the clutch disc, which in turn is mounted on the adjusting screw 20, which is attached to brake lever 12.

A desired result through use of the present slack adjuster is that piston travel be uniform in application of the brakes. Such uniform piston travel is brought about by taking up slack in the system as the brake linings become worn. Slack is taken up on the brake release portion of the brake operating cycle. Slack is introduced during the brake application portion as just described.

When the brakes are released, piston spring 40 will move piston head 32 to the right, pulling the clutch assembly, as well as the adjusting screw 20, toward the right. Lock-up spring 80 will retain clutch disc 56 in contact with clutch surface 60 until such time as the trigger spring 100 can again be effective to apply force through thrust plate 98 to clutch pins 96. When the trigger spring overcomes the force of lock-up spring 80, clutch disc 56 is free to rotate on the adjusting screw and will so rotate in moving back to clutch face 58 with the amount of rotation and the consequent axial movement being a take-up of slack. This movement will not come about until piston head 32 has moved a distance to the right to move the thrust plate away from adjusting ring 110. Rotation of clutch disc 56 on the adjusting screw has the effect of lengthening the slack adjuster and the amount of axial relative movement between the clutch disc and the adjusting screw is determined by the slack that must be taken up in order to provide a generally uniform piston travel in brake application. The clutch disc will continue to rotate until such time as the force of the trigger spring 100 has overcome the force of lock-up spring 80, at which time the clutch disc will again be in contact with clutch surface 58 on the left side of clutch housing assembly 26.

As can be seen in the drawings, the slack adjuster is not always centered within outer housing 42. It is normally centered when the brakes are fully applied and when the brake operating lever 12 is generally at right angles to the axis of the slack adjuster.

As the brake linings wear, and as a greater amount of movement of lever arm 12 is required for full application force, the slack adjuster will continue to take up slack which means it will lengthen during the period that clutch disc 56 is rotating between the two clutch surfaces during brake release. This lengthening of the slack adjuster, or take-up of slack, will provide for generally constant travel of the piston, regardless of the degree of movement required by lever 12 to reach a full brake application position. FIG. 1 illustrates different positions at the lever arm during brake application movement as the brake linings wear.

Adjusting ring 110, which is held in position by adjusting screws 108, can have its relative position adjusted, either at the factory or in the field, in order to insure that thrust plate 98 or the trigger element as it is sometimes termed, will contact the adjusting ring after predetermined movement of the piston head. The position of ring 110 determines desired piston travel and slack is introduced or taken up based upon contact between the adjusting ring and thrust plate 98.

Of importance is the attachment of compression tube 28 to piston head 32 and diaphragm 34. During operation of the slack adjuster, rotary forces will be applied to the clutch housing assembly and the compression tube and such force is resisted by the diaphragm.

Whereas the preferred form of the invention has been shown and described herein, it should be realized that there may be many modifications, subsitutions and alterations thereto.

The embodiments of the invention in which an exclusive property or privilege is claimed are defined as follows:

1. A combination in-line brake slack adjuster and air chamber including an air chamber housing, a diaphragm movable in said housing, a piston movable in said housing and attached to said diaphragm, a return spring positioned within said air chamber and urging said piston, and diaphragm to a brake release position, an air chamber housing extension, a slack adjuster coaxially positioned within said housing extension and having relatively movable telescoping members, one of which is attached to said piston the other of said telescoping members adapted to be attached to a brake operating member, brake force applying spring means coaxially positioned about said other telescoping member and urging said telescoping members in opposite directions, a clutch disc rotatably mounted on said other of said telescoping members and first and second spaced clutch surfaces on said one of said telescoping members, said clutch disc interconnecting said telescoping member for relative movement therebetween to take up and let out slack to maintain a generally uniform piston travel during brake application movement, movement of said clutch disc from said first clutch surface to said second clutch surface during brake application movement of the piston contracts said slack adjuster, with movement, during brake release, of said clutch disc from said second clutch surface to said first clutch surface lengthening said slack adjuster, and a thrust assembly including a thrust plate coaxial with said telescoping members and a thrust spring also coaxial with said telescoping members, with said thrust spring, through said thrust plate, urging said clutch disc into contact with said first clutch surface, a stop on said air chamber housing extension, contact between said thrust plate and said stop, during brake application movement, removing the pressure of said thrust spring upon said clutch disc to permit movement thereof to said second clutch surface, whereby said slack adjuster becomes rigid between the piston and the brake operating member.

2. The slack adjuster of claim 1 further characterized in that said spring means includes multiple springs, coaxially arranged about one of said relatively movable telescoping members, and functionally combining the axial thrust therefrom to urge said axially movable telescoping members in opposite directions.

* * * * *